United States Patent
Tiwari et al.

(10) Patent No.: US 12,297,053 B2
(45) Date of Patent: May 13, 2025

(54) MULTI SHAFT TRANSPORT SYSTEMS, APPARATUSES, AND METHODS

(71) Applicant: INTELLIGRATED HEADQUARTERS, LLC, Mason, OH (US)

(72) Inventors: Sudhanshu Tiwari, Bangalore (IN); Ravi Jain, Bangalore (IN)

(73) Assignee: Intelligrated Headquarters, LLC, Mason, OH (US)

( * ) Notice: Subject to any disclaimer, the term of this patent is extended or adjusted under 35 U.S.C. 154(b) by 133 days.

(21) Appl. No.: 18/159,289

(22) Filed: Jan. 25, 2023

(65) Prior Publication Data

US 2024/0246774 A1 Jul. 25, 2024

(51) Int. Cl.
*B65G 47/53* (2006.01)

(52) U.S. Cl.
CPC ................... *B65G 47/53* (2013.01)

(58) Field of Classification Search
None
See application file for complete search history.

(56) References Cited

U.S. PATENT DOCUMENTS

| | | | | |
|---|---|---|---|---|
| 3,587,818 A | * | 6/1971 | Hansen | B65G 47/54 198/368 |
| 3,592,325 A | * | 7/1971 | Sullivan | B65G 1/0485 198/370.1 |
| 3,710,917 A | * | 1/1973 | Black | B65G 47/54 198/370.09 |
| 4,907,692 A | * | 3/1990 | Sogge | B65G 13/10 198/786 |
| 4,981,209 A | * | 1/1991 | Sogge | B65G 13/10 198/786 |
| 5,396,977 A | * | 3/1995 | Lantis | B65G 13/10 198/786 |

(Continued)

FOREIGN PATENT DOCUMENTS

| | | |
|---|---|---|
| AT | 15448 U1 | 9/2017 |
| CN | 105329602 A | 2/2016 |

(Continued)

OTHER PUBLICATIONS

Extended European Search Report Mailed on Sep. 5, 2024 for EP Application No. 23217780, 9 page(s).

*Primary Examiner* — Kavel Singh
(74) *Attorney, Agent, or Firm* — Alston & Bird LLP

(57) ABSTRACT

Methods, apparatuses, systems, and/or the like are provided. An example multi-shaft transport apparatus includes a first shaft assembly. The first shaft assembly includes a first plurality of shafts aligned in a first direction, wherein one or more shafts of the first plurality of shafts are rotatable shafts. The first shaft assembly also includes a first plurality of wheel assemblies operably connected to the first plurality of shafts and configured to rotate with the one or more shafts of the first plurality of shafts; a set of pulleys comprising one or more pulleys operably connected to the one or more shafts of the first plurality of shafts; and a first driver operably connected to the set of pulleys and configured to drive the one or more pulleys such that the one or more pulleys cause the one or more shafts of the first plurality of shafts to rotate.

18 Claims, 12 Drawing Sheets

(56) References Cited

U.S. PATENT DOCUMENTS

| | | | | |
|---|---|---|---|---|
| 5,518,104 | A * | 5/1996 | Mattingly | B65G 47/263 |
| | | | | 198/782 |
| 7,040,478 | B2 * | 5/2006 | Ehlert | B65G 13/10 |
| | | | | 198/370.09 |
| 11,319,155 | B2 * | 5/2022 | Huang | B65G 13/065 |
| 11,447,339 | B2 * | 9/2022 | San | B29C 45/14344 |
| 11,548,734 | B2 * | 1/2023 | Fourney | B65G 47/54 |
| 11,787,643 | B2 * | 10/2023 | Namikawa | B65G 13/071 |
| | | | | 198/369.5 |

FOREIGN PATENT DOCUMENTS

| | | |
|---|---|---|
| CN | 205327974 U | 6/2016 |
| CN | 207192098 U | 4/2018 |
| CN | 109502311 A | 3/2019 |
| CN | 209502285 U | 10/2019 |
| CN | 110538799 A | 12/2019 |
| CN | 210213984 U | 3/2020 |
| CN | 110950032 A | 4/2020 |
| CN | 211225353 U | 8/2020 |
| CN | 113942818 A | 1/2022 |
| CN | 216174296 U | 4/2022 |
| DE | 2515009 A1 | 10/1976 |
| GB | 1224100 A | 3/1971 |
| GB | 1478757 A | 7/1977 |

\* cited by examiner

MULTI SHAFT TRANSPORT SYSTEMS, APPARATUSES, AND METHODS

TECHNICAL FIELD

The present disclosure relates generally to conveyor systems, and more particularly, in some examples, to diverting one or more objects between one or more conveyor belts within a conveyor system.

BACKGROUND

In industrial environments, transport systems such as conveyor systems may be used to support and move one or more objects around the environment (e.g., a warehouse, a distribution center, etc.). A conveyor system may have multiple conveyor belts transporting objects in multiple directions. One way to improve the efficiency by which objects are transported around the industrial environment may be to interconnect the various conveyor belts of the conveyor system. Connected conveyor belts may be used to create an increased number of directions by which the one or more objects may be transported by the conveyor system.

Transfer apparatuses may be implemented in conveyor systems to facilitate transfer between two or more conveyor belts. One or more of the objects transported by the conveyor system may be transferred (e.g., diverted, redirected, etc.) by the transfer apparatus from a first conveyor belt traveling in a first direction to a second, connected conveyor belt traveling in a second direction, different from the first. For example, the first conveyor belt may be traveling in a first direction and the second conveyor belt may be traveling in a second direction perpendicular (i.e., 90 degrees) to the first conveyor belt. Transfer apparatuses may use various forced movement devices, such as rollers and rotating shafts and wheels, to transfer one or more objects from one conveyor belt to another.

Increasing the number of directions in which a transfer apparatus can transfer the one or more objects would lead to corresponding increases in the efficiency of the conveyor system in which the transfer apparatus is implemented. For example, it would greatly increase efficiency for a conveyor system to implement a transfer apparatus that could transfer one or more objects from not only a first conveyor to a second conveyor traveling perpendicular to the first conveyor, but also to a third conveyor traveling at a forty-five degree angle to the first conveyor's direction, as well as to a fourth conveyor traveling at a thirty-degree angle to the first conveyor's direction, and so on for as many conveyors and as many directions as desired.

Through applied effort, ingenuity, and innovation, Applicant has solved problems relating to transfer apparatuses by developing solutions embodied in the present disclosure, which are described in detail below.

BRIEF SUMMARY

In general, embodiments of the present disclosure provide methods, apparatuses, systems, computing devices, computing entities, and/or the like.

In accordance with various embodiments of the present disclosure there is provided a multi-shaft transport apparatus including a first shaft assembly. In some embodiments, the first shaft assembly includes a first plurality of shafts aligned in a first direction, wherein one or more shafts of the first plurality of shafts are rotatable shafts. In some embodiments, the first shaft assembly further includes a first plurality of wheel assemblies operably connected to the first plurality of shafts and configured to rotate with the one or more shafts of the first plurality of shafts; a set of pulleys comprising one or more pulleys operably connected to the one or more shafts of the first plurality of shafts; and a first driver operably connected to the set of pulleys and configured to drive the one or more pulleys such that the one or more pulleys cause the one or more shafts of the first plurality of shafts to rotate.

In some embodiments, the multi-shaft transport apparatus further includes a second shaft assembly including a second plurality of shafts aligned in a second direction, wherein one or more shafts of the second plurality of shafts are fixed shafts; a second plurality of wheel assemblies operably connected to the second plurality of shafts; and a second driver operably connected to and configured to drive one or more of the second plurality of wheel assemblies.

In some embodiments, the multi-shaft transport apparatus further includes one or more belts configured to operably connect the second driver with the one or more wheel assemblies of the second plurality of wheel assemblies.

In some embodiments, the first driver and the second driver are motor-driven rollers.

In some embodiments, the first plurality of shafts have a first diameter and the second plurality of shafts have a second diameter.

In some embodiments, the first diameter and the second diameters are different lengths.

In some embodiments, the first shaft assembly and the second shaft assembly are aligned along a shared plane.

In some embodiments, one or more of the first plurality of wheel assemblies and the second plurality of wheel assemblies are omnidirectional wheels.

In some embodiments, the first direction and the second direction are orthogonal.

In some embodiments, the multi-shaft transfer apparatus further includes a housing configured to at least partially enclose one or more of the first shaft assembly and the second shaft assembly.

In some embodiments, the multi-shaft transfer apparatus further includes one or more motion transfer devices configured to do one or more of transfer motion from the first shaft assembly to the second shaft assembly or to transfer motion from the second shaft assembly to the first shaft assembly.

In some embodiments, one or more of the first plurality of shafts and the second plurality of shafts further includes an over-molded plastic shaft.

According to various embodiments, there is provided a multi-shaft transport system including a first conveyor system configured to transport one or more objects in a first flow path aligned along the first conveyor system; a second conveyor system configured to transport the one or more objects in a second flow path aligned along the second conveyor system; and a multi-shaft transport apparatus disposed at least partially within the first conveyor system.

In some embodiments, the multi-shaft transport apparatus includes: a first shaft assembly including a first plurality of shafts aligned in a first direction, wherein one or more shafts of the first plurality of shafts are rotatable shafts; a first plurality of wheel assemblies operably connected to the first plurality of shafts and configured to rotate with the one or more shafts of the first plurality of shafts that are rotatable shafts; a second shaft assembly including a second plurality of shafts aligned in a second direction, wherein one or more shafts of the second plurality of shafts are fixed shafts; a second plurality of wheel assemblies operably connected to the second plurality of shafts; a set of pulleys comprising one or more pulleys operably connected to the one or more shafts of the first plurality of shafts that are rotatable shafts; a first driver operably connected to the set of pulleys and configured to drive the one or more pulleys such that the one or more pulleys cause the one or more shafts of the first plurality of shafts that are rotatable shafts to rotate; and a second driver, and wherein the second driver is operably connected to and configured to drive one or more wheels of the second plurality of wheel assemblies such that the one or more shafts of the second plurality of shafts that are fixed shafts remain fixed, wherein the multi-shaft transport apparatus is configured to do one or more of: divert a first flow of the one or more objects from the first flow path of the first conveyor system to the second flow path of the second conveyor system, or divert a second flow of the one or more objects from the second flow path of the second conveyor system to the first flow path of the first conveyor system.

In some embodiments, the multi-shaft transport system further includes one or more belts configured to operably connect the second driver with the one or more wheels of the second plurality of wheel assemblies.

In some embodiments, the multi-shaft transport system further includes, the one or more of the first plurality of wheel assemblies and the second plurality of wheel assemblies are omnidirectional wheels.

In some embodiments, the first flow path and the second flow path define an angle between them, the angle ranging between 0 degrees and 90 degrees.

In some embodiments, the multi-shaft transport system further includes one or more motion transfer devices configured to do one or more of transfer motion from the first shaft assembly to the second shaft assembly or to transfer motion from the second shaft assembly to the first shaft assembly.

According to various embodiments, there is provided a method of using a multi-shaft transport system, wherein the system includes: a first conveyor system configured to transport one or more objects in a first flow path aligned along the first conveyor system; a second conveyor system configured to transport the one or more objects in a second flow path aligned along the second conveyor system; and a multi-shaft transport apparatus disposed at least partially within the first conveyor system, the multi-shaft transport apparatus including: a first shaft assembly including a first plurality of shafts aligned in a first direction, wherein one or more shafts of the first plurality of shafts are rotatable shafts; a first plurality of wheel assemblies operably connected to the first plurality of shafts and configured to rotate with the one or more shafts of the first plurality of shafts; a second shaft assembly including a second plurality of shafts aligned in a second direction, wherein one or more shafts of the second plurality of shafts are fixed shafts; a second plurality of wheel assemblies operably connected to the second plurality of shafts; a set of pulleys including one or more pulleys operably connected to the one or more shafts of the first plurality of shafts; a first driver operably connected to the set of pulleys and configured to drive the one or more pulleys such that the one or more pulleys cause the one or more shafts of the first plurality of shafts to rotate; and a second driver, and wherein the second driver is operably connected to and configured to drive one or more wheels of the second plurality of wheel assemblies. In some embodiments, the method includes diverting, by the first plurality of wheel assemblies, the one or more objects from the first flow path to the second flow path; and diverting, by the second plurality of wheel assemblies, the one or more objects from the second flow path to the first flow path.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Figure 1A:
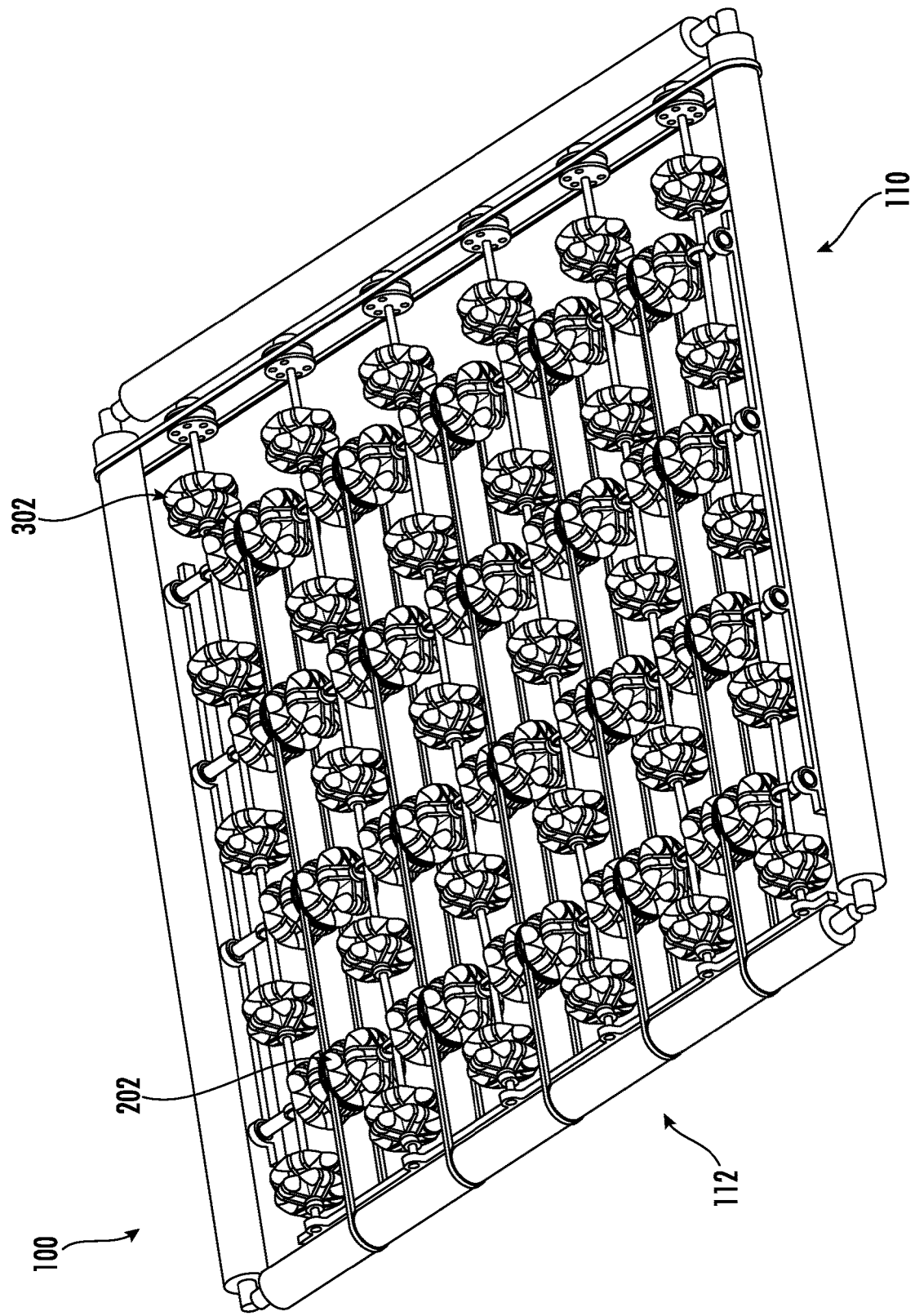
FIG. 1A is an example angled perspective view of an example multi-shaft transport apparatus in accordance with some embodiments of the present disclosure.

Some embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

In environments such as distribution centers, warehouses, and/or the like, objects may be transported using one or more conveyor systems, which may include multiple conveyor belts for transporting various objects. Some conveyor systems may include overlapping conveyor belts, each of which may be configured to transport objects in different directions.

Although not limited to conveyor systems, a multi-shaft transport apparatus may be used to divert the path of one or more objects traveling in a conveyor system. The apparatus may be integrated into the conveyor system (e.g., embedded into one or more of the conveyor belts) at one or more locations on the conveyor system where two or more conveyor belts have intersecting flows; in at least this way, the apparatus may be configured to divert objects such that objects traveling along a first direction on a first conveyor belt are diverted onto a second conveyor belt traveling in a second direction.

An example multi-shaft transport apparatus may include one or more shaft assemblies, with each shaft assembly including a plurality of wheel assemblies operably connected to a plurality of shafts. Some multi-shaft transport apparatuses may have a first shaft assembly arranged in one direction and a second shaft assembly arranged in a second direction. The first and second directions may be orthogonal to each other. In some embodiments, one or more shafts of the first plurality of shafts of the first shaft assembly may be configured to rotate with one or more wheels of the first plurality of assembly. This rotation may be driven by one or more pulleys coupled to one or more drivers (e.g., a motor-driven roller). In some embodiments, a motor-driven roller drives (via the one or more pulleys) the first plurality of shafts of the first shaft assembly, thereby causing, in some examples, the first plurality of wheel assemblies to spin, which may move one or more objects moving within the conveyor system.

In some embodiments, one or more of the shafts of the second plurality of shafts may not be configured to rotate. That is, the shafts are fixed or otherwise secured not to rotate and/or the shafts are not connected (directly or indirectly) to any drivers (e.g., the motor-driven roller). However, in some embodiments, the second plurality of wheel assemblies on the second plurality of shafts may be configured to rotate independently of the shafts (although, in some embodiments, rotation of the wheels may cause rotation of the shafts). In some embodiments, the second plurality of wheel assemblies may be operably connected to one or more drivers (e.g., a motor-driven roller).

As previously mentioned, an example multi-shaft transport apparatus may include one or more drivers, each of which may operate independently of the other. In some embodiments, a multi-shaft transport apparatus may include one or more belts, such as a toother belt or a timing belt, may be mounted to one or more of the wheel assemblies and operably connected to one or more of the drivers. For example, the second plurality of wheel assemblies may be operably connected to one or more belts that are operably connected to one or more drivers.

In some examples, the wheel assemblies may be omnidirectional wheels, and, as previously mentioned, the wheel assemblies in some embodiments may be driven directly by the one or more drivers without any rotation of the shafts.

In some examples, the shaft assemblies may be disposed in the same plane of the apparatus such that wheel assemblies of more than one shaft assembly may contact one or more objects being supported by the multi-shaft transport apparatus at any given time.

An example multi-shaft transport apparatus may have a first shaft assembly configured to rotate in a first direction and a second shaft assembly configured to rotate in a second direction. The example first shaft assembly may comprise the first plurality of wheel assemblies operably connected to first plurality of shafts operably connected to one or more pulleys that are operably connected to a first roller, such that the first roller causes the first plurality of shafts to rotate, thereby rotating the wheel assemblies and causing objects supported by the multi-shaft transport apparatus to move in the first direction. The example second shaft assembly may comprise the second plurality of wheel assemblies operably connected to the second plurality of shafts, wherein the second plurality of wheel assemblies are operably connected to a second driver, such that the second driver causes the second plurality of wheel assemblies to rotate.

Continuing with the example multi-shaft transport apparatus described, to transport an object in the first direction, the example multi-shaft transport apparatus rotates the first plurality of shafts of the first shaft assembly, and to transport an object in the second direction, the example multi-shaft transport apparatus rotates the second plurality of wheel assemblies of the second shaft assembly. In this example, the first direction and the second direction define a 90 degree angle between them. The example multi-shaft transport apparatus may divert an object between the first and second directions (i.e., between 0 and 90 degrees) by running the first driver at a first speed and the second driver at a second speed. Hence, for the example multi-shaft transport assembly to divert an object at a 45 degree angle between the first and second directions, the first and second drivers would drive the first plurality of shafts and the second plurality of wheel assemblies, respectively, such that the first plurality of shafts and the second plurality of wheel assemblies rotated at approximately the same speed.

Example Multi-Shaft Transport Systems

Figure 1B:
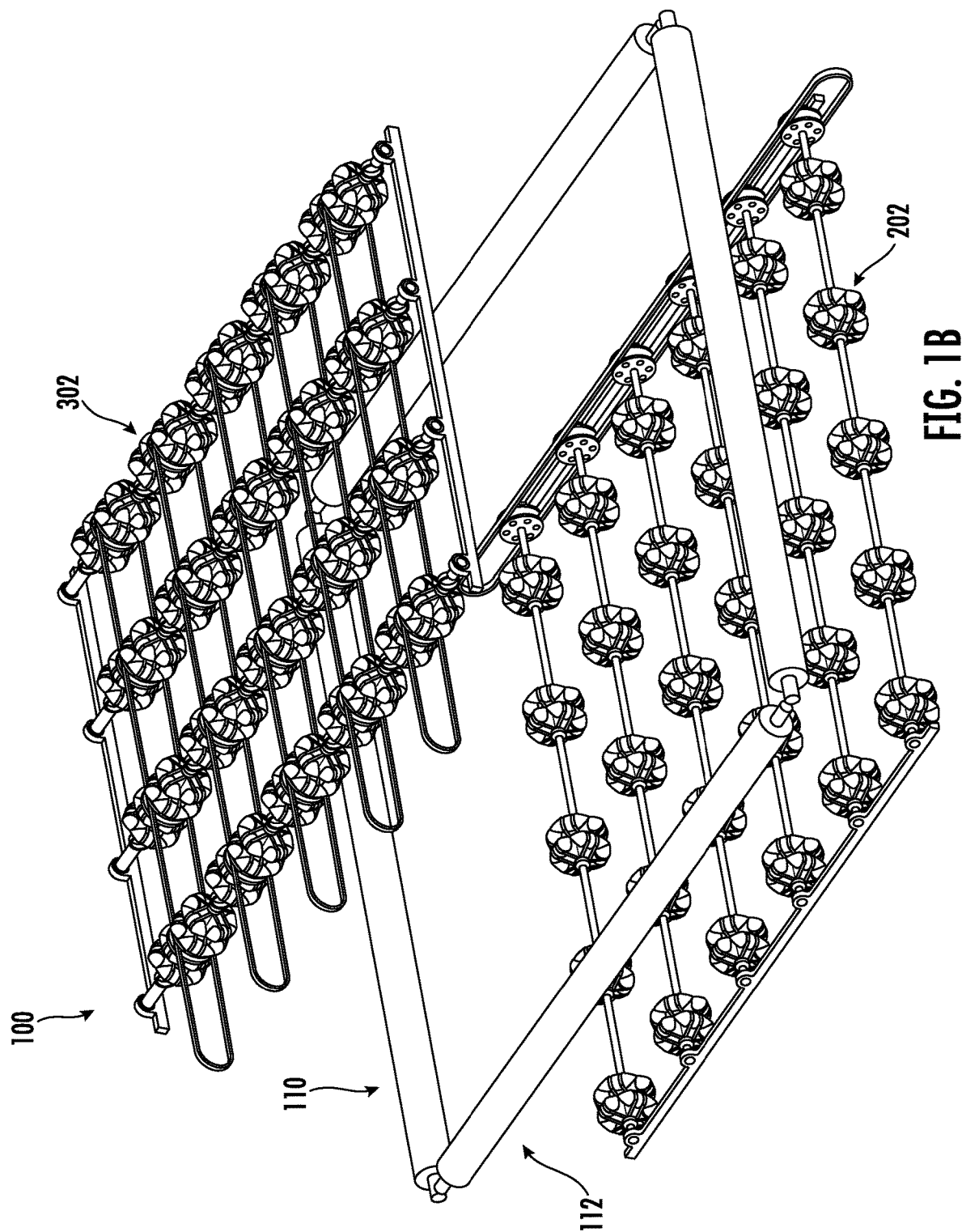
FIG. 1B is an example exploded view of an example multi-shaft transport apparatus in accordance with some embodiments of the present disclosure.

Referring to FIGS. 1A and 1B, an example multi-shaft transport apparatus 100 may include a first shaft assembly 202 and a second shaft assembly 302, each of which will be described in greater detail later in this disclosure. In some embodiments, the first and second shaft assemblies 202, 302 may be in the same plane within the apparatus 100. However, as shown in at least FIGS. 1A-C, and as will be described in greater detail below, the various components of the shaft assemblies 202, 302 may not interfere with one another directly.

Figure 1C:
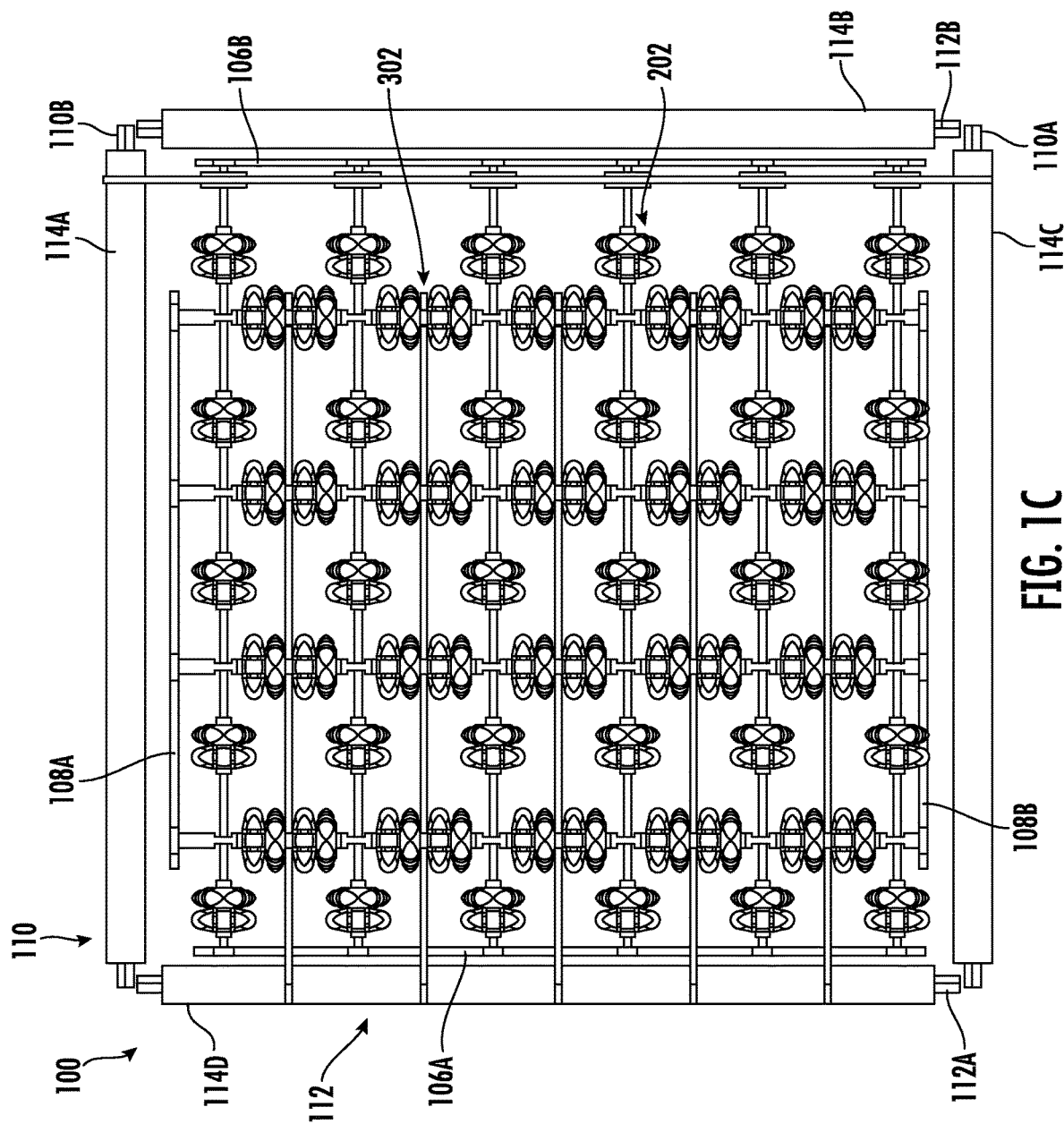
FIG. 1C is an example top view of an example multi-shaft transport apparatus in accordance with some embodiments of the present disclosure.

In some embodiments, and as shown in at least FIG. 1C, the first shaft assembly 202 may include a frame 104 having a first pair of rails 106A, 106B and a second pair of rails 108A, 108B. In some embodiments, the first shaft assembly 202 may be fixedly attached (e.g., mounted using one or more fasteners) to the first pair of rails 106, 106B and the second shaft assembly 302 may be fixedly attached to the second pair of rails 108A, 108B. In some embodiments, the first pair of rails 106A, 106B may be parallel to each other and perpendicular to the second pair of rails 108A, 108B, which may also be parallel to each other. In some embodiments, the rails may be metal, such as aluminum.

Still referring to FIG. 1B, in some embodiments, the multi-shaft transport apparatus 100 may include a first driver 110 configured to drive one or more components of the first shaft assembly 202 and a second driver 112 configured to drive one or more components of the second shaft assembly 302. In some embodiments, one or more of the first and second drivers 110, 112 may be a motor-driven roller. In some embodiments, the first driver 110 may be a pair of motor-driven rollers 110A, 110B, and in some embodiments the second driver 112 may be a pair of motor-driven rollers 112A, 112B.

In some embodiments, the multi-shaft transport apparatus 100 may include one or more sheaths 114A, 114B, 114C, 114D. In some embodiments, the one or more plastic sheaths may cover one or more of the drivers 110, 112. In some embodiments, the sheaths 114A-D may be plastic sheaths. In some embodiments, the sheaths 114A-D may be configured to prevent, in some examples, damage to the drivers 110, 112.

Figure 1D:
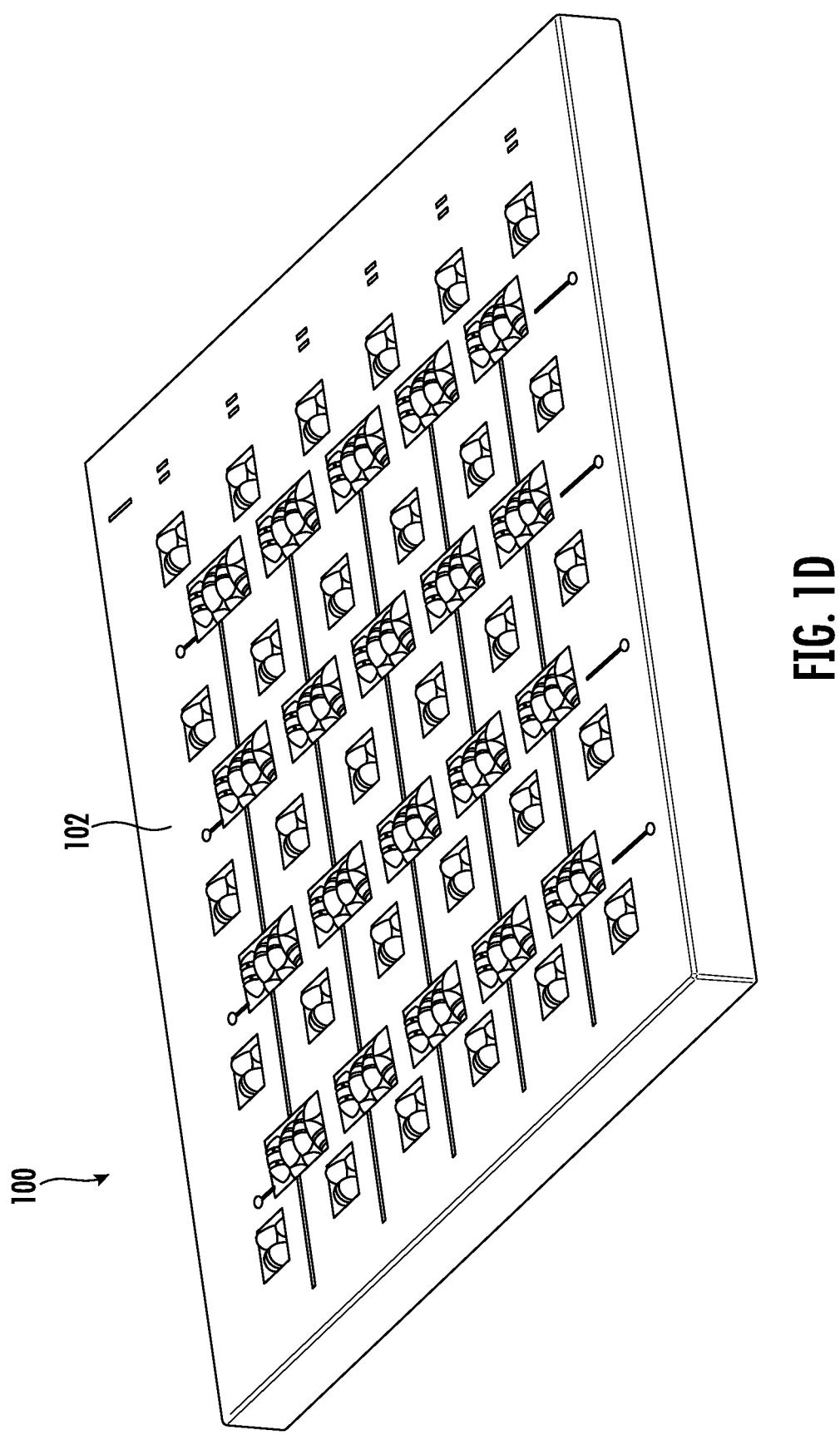
FIG. 1D is an example angled perspective view of an example multi-shaft transport apparatus in accordance with some embodiments of the present disclosure.

In some embodiments, and as shown in at least FIG. 1D, the multi-shaft transport apparatus 100 may include a housing 102 configured to at least partially enclose one or more of the first shaft assembly 202 and the second shaft assembly 302.

Figure 2A:
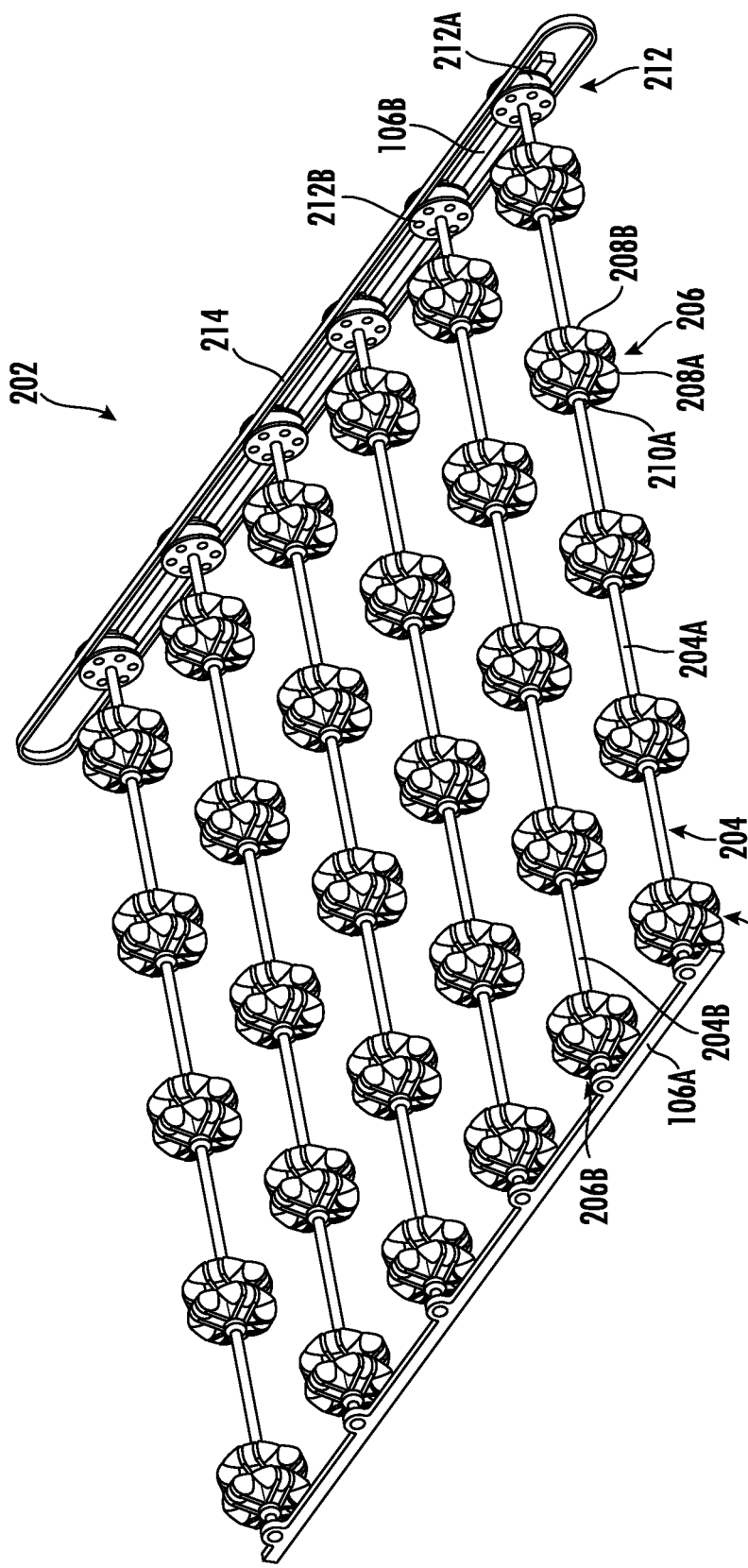
FIG. 2A is an example angled perspective view of an example shaft assembly of an example multi-shaft transport system in accordance with some embodiments of the present disclosure.
Figure 2B:
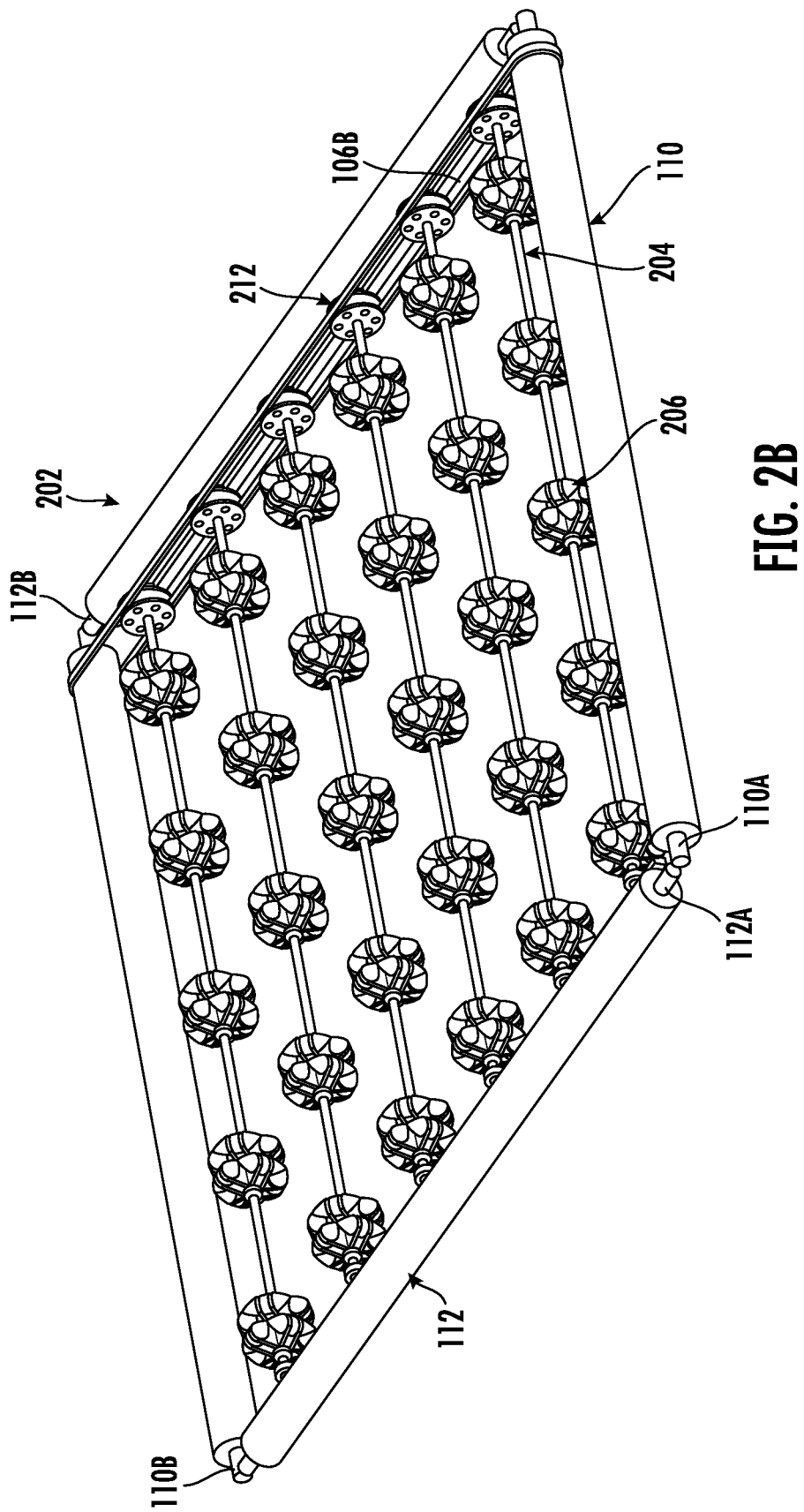
FIG. 2B is an example angled perspective view of an example shaft assembly of an example multi-shaft transport system in accordance with some embodiments of the present disclosure.

Referring to FIGS. 2A and 2B, in some embodiments, the first shaft assembly 202 may include a first plurality of shafts 204. In some embodiments, the first plurality of shafts 204 may include a first shaft 204A, a second shaft 204B, etc. In some embodiments, one or more of the first plurality of shafts 206 may be configured to rotate and may be positioned in a first direction such that when the first plurality of shafts 206 rotates, each shaft rotates in at least substantially the first direction. In some embodiments, one or more shafts of the first plurality of shafts 204 may have the same diameter, but in other embodiments one or more shafts of the first plurality of shafts 204 may have varying diameters. In some embodiments, one or more shafts of the first plurality of shafts 204 may be made of metal, such as aluminum, steel, titanium, or the like; in other embodiments, the one or more shafts 204 may be composed of a metal alloy or plastic, depending on the needs of the apparatus 100. In some embodiments, one or more shafts of the first plurality of shafts 204 may be arranged to be at least substantially parallel to each other. In some embodiments, one or more shafts of the first plurality of shafts 204 may be spaced equally apart from each other. In some embodiments, one or more of the shafts 204 may be an over-molded plastic shaft.

In some embodiments, the first shaft assembly 202 may include a first plurality of wheel assemblies 206. An example wheel assembly 206 may include one or more wheels 208A, 208B, etc. and one or more bearings 210A, 210B, etc. In some embodiments, the wheels 208A, 208B may be omni-directional wheels. In some embodiments, the first plurality of wheel assemblies 206 may include a first wheel assembly 206A, a second wheel assembly 206B, etc.

In some embodiments, one or more shafts of the first plurality of shafts 204 may be operably connected to one or more wheels of the first plurality of wheel assemblies 206. For example, a first wheel assembly 206A may be operably connected to a first shaft 204A, a second wheel assembly 206B may be operably connected to a second shaft 206B, etc. An example wheel assembly 206A may in some embodiments, be operably connected to an example shaft 206B such that the example wheel assembly 206A is configured to rotate with the example shaft 206B. This example of operably connection may be carried out for all of the wheel assemblies and all of the shafts in their respective pluralities 204, 206 such that, when the first plurality of shafts 204 rotates, the first plurality of wheel assemblies 206 rotates.

In some embodiments, one or more shafts of the first plurality of shafts 204 may be operably connected to one or more pulleys of a first set of pulleys 212, each of which (e.g., 212A, 212B, etc.) may be operably connected to one or more shafts of the first plurality of shaft assemblies 204. In some embodiments, the one or more shafts of first plurality of shafts 204 and the one or more pulleys of the first set of pulleys 212 may be operably connected such that when the pulleys are rotated, the shafts rotate, as well. In some embodiments, the rotation of the pulleys may be synchronized, such as by a first shaft cable 214, such as an O-band, to which one or more pulleys of the first set of pulleys 212 may be operably connected. The O-band may be configured to transfer motion between the first plurality of shafts 204. Although only one O-band and one set of pulleys are shown in the associated FIGS., it will be understood that more than one O-band and more than one set of pulleys may be used in various embodiments.

In some embodiments, one or more shafts of the first plurality of shafts 204 may be fixedly attached to one or more rails 106A, 106B of the apparatus 100. In some embodiments, the shafts 204 may to the rails 106A, 106B by one or more bearings. In some embodiments, the shafts 204 may be connected to the rails 106A, 106B such that the shafts are still able to rotate relative to the rails 106A, 106B (e.g., the bearings attaching the shafts 204 to the rails 106A, 106B may be configured to allow the shafts to rotate within the bearings, or the bearings may be configured to rotate with the shafts).

As shown in FIG. 2B, and as mentioned previously in this disclosure, the first shaft assembly 202 may be operably connected to one or more drivers 110, 112. In some embodiments, the first driver 110 may be operably connected to the first set of pulleys 212. In some embodiments, this connection may be made by the first shaft cable 214, which may operably connect the first set of pulleys 212 to the first driver 110. In some embodiments, and as previously described, the first driver 110 may include a first motor driven roller 110A and a second motor-driven roller 110B. In some embodiments, and as shown in at least FIG. 2B, the first shaft cable 214 may be wrapped around each of these motor-driven rollers 110A, 110B and configured to drive the first set of pulleys 212 when the motor-driven rollers 110A, 110B are driven. The driving of the first set of pulleys 212 may in turn drive one or more shafts of the first plurality of shafts 204, which may in turn rotate one or more of the first plurality of wheel assemblies 206. In at least this way, the first shaft assembly 202 may be driven by the first driver 110 and configured to move one or more objects supported by the apparatus 100 in a first direction (e.g., the direction in which the first plurality of shafts 204 rotate).

Figure 3A:
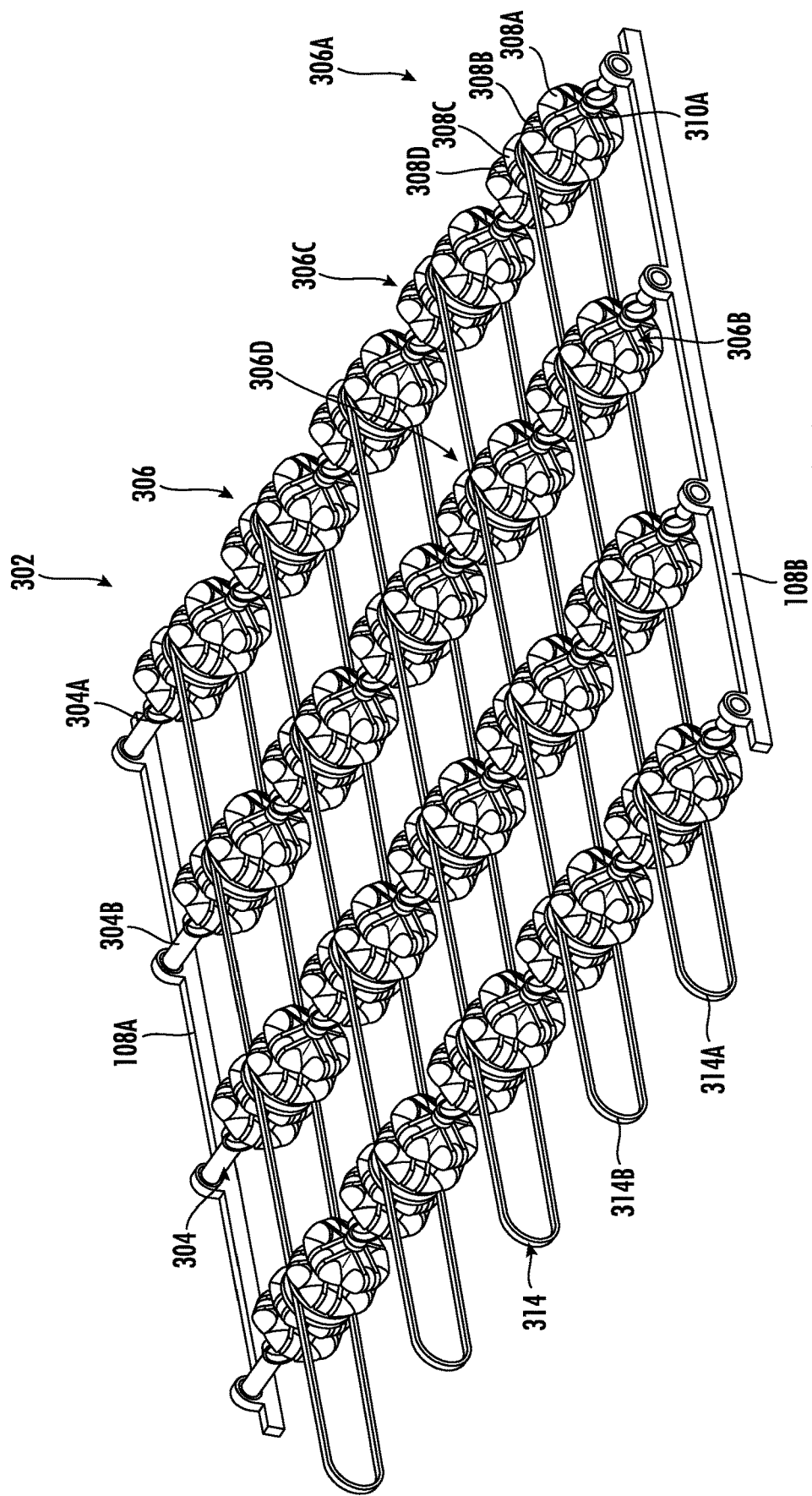
FIG. 3A is an example angled perspective view of an example shaft assembly of an example multi-shaft transport system in accordance with some embodiments of the present disclosure.
Figure 3B:
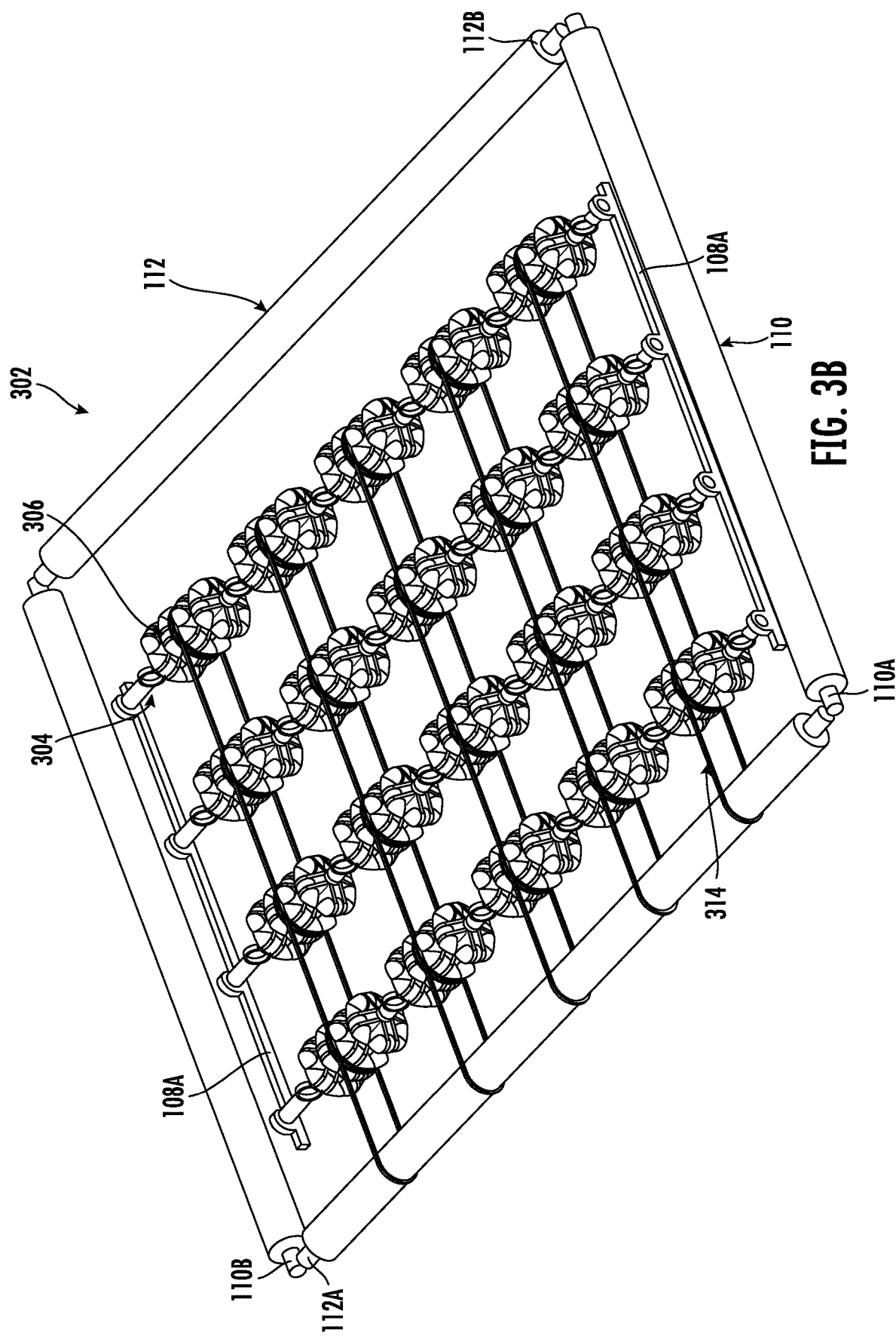
FIG. 3B is an example angled perspective view of an example shaft assembly of an example multi-shaft transport system in accordance with some embodiments of the present disclosure.

Referring to FIGS. 3A and 3B, in some embodiments, the second shaft assembly 302 may include a second plurality of shafts 304, which may include one or more shafts 304A, 304B, etc. Except where noted otherwise, the various properties of the second plurality of shafts 304 may be considered to mirror those of the first plurality of shafts 204. In some embodiments, one or more shafts of the second plurality of shafts 304 may be fixed such that they are not configured to rotate. In some embodiments, the second plurality of shafts 304 may be fixedly attached to one or more rails 108A, 108B. For example, by one or more bearings configured to hold the shafts 304 in position. In some embodiments, one or more of the shafts 304 may have one or more over-molded portions.

In some embodiments, the second shaft assembly 302 may include a second plurality of wheel assemblies 306, which may include a first wheel assembly 306A, a second 306B, etc. In some wheel assemblies, and as shown in the associated figures, the second plurality of wheel assemblies 306 may include more wheels than the first plurality of wheel assemblies 206. For example, the wheel assemblies of the second plurality of wheel assemblies 306 may be include four wheels 308A, 308B, 308C, and 308D. Except where noted otherwise, the various properties of the second plurality of wheel assemblies 306 may be considered to mirror those of the first plurality of wheel assemblies 206. In some embodiments, the second plurality of wheel assemblies may include one or more wheels 308A, 308B and one or more bearing 310A, 310B. In some embodiments, these wheels 308A, B and bearings 310A, 310B may be described similarly to the wheels 208A-B and bearings 210A-210B described previously. In other embodiments, though, the bearings of the second plurality of wheel assemblies 306 may be configured to further enable rotation of the second plurality of wheel assemblies independently of the second plurality of shafts 304.

In some embodiments, the second plurality of wheel assemblies 306 may be operably connected to the second plurality of shafts 304 in a similar manner to how the first plurality of wheel assemblies 206 may be operably connected to the first plurality of shafts 204. However, in some embodiments, there is a difference between the operable connection of the first plurality of wheel assemblies 206 to the first plurality of shafts 204 and the operable connection of the second plurality of wheel assemblies 306 to the second plurality of shafts 304. In some embodiments, one or more of the wheel assemblies of the second plurality of wheel assemblies 306 may be configured to rotate independently of the second plurality of shafts 304. In some embodiments, one or more of the second plurality of wheel assemblies 306 may be aligned in a second direction such that when the one or more of the second plurality of wheel assemblies 306 rotates, they rotate in the second direction.

In some embodiments, one or more of the second plurality of wheel assemblies 306 may be operably connected to one or more cables of the second shaft assembly 314. In some embodiments, the one or more cables of the second shaft 314 may be O-bands. In some embodiments, the O-bands 314 may be operably connected to one or more wheel assemblies of the second plurality of wheel assemblies 306, as well as operably connected to the second driver 112. For example, O-band 314A may be operably connected to at least wheel assemblies 306A, 306B, etc., while O-band 314B may be operably connected to at least wheel assemblies 306C, 306D, etc. In some embodiments, the one or more cables of the second shaft assembly 314 may be one or more of a synchronous or poly V or toothed or timing belt, which may be configured to be driven directly by one or more of the drivers 110, 112.

Referring now to FIG. 3B, as with the first shaft assembly 202 and as shown in FIG. 2B, the third shaft assembly 302 may be operably connected to one or more rollers 110, 112. In some embodiments, and as shown in FIG. 3B, the second plurality of wheels 306 may be operable connected by one or more O-bands 314 to the first motor-driven roller 112A. However, in some embodiments, the second plurality of wheels 306 may be operably connected to the second motor-driven roller 112B. As previously mentioned, the one or more shafts of the second plurality of shafts 304 are not configured to rotate, thus the second plurality of wheels 306 is directly connected to and controlled by the second roller 112. In at least this way, the second plurality of wheels 306 may rotate independently of the shafts 304 to which they are coupled.

Figure 4:
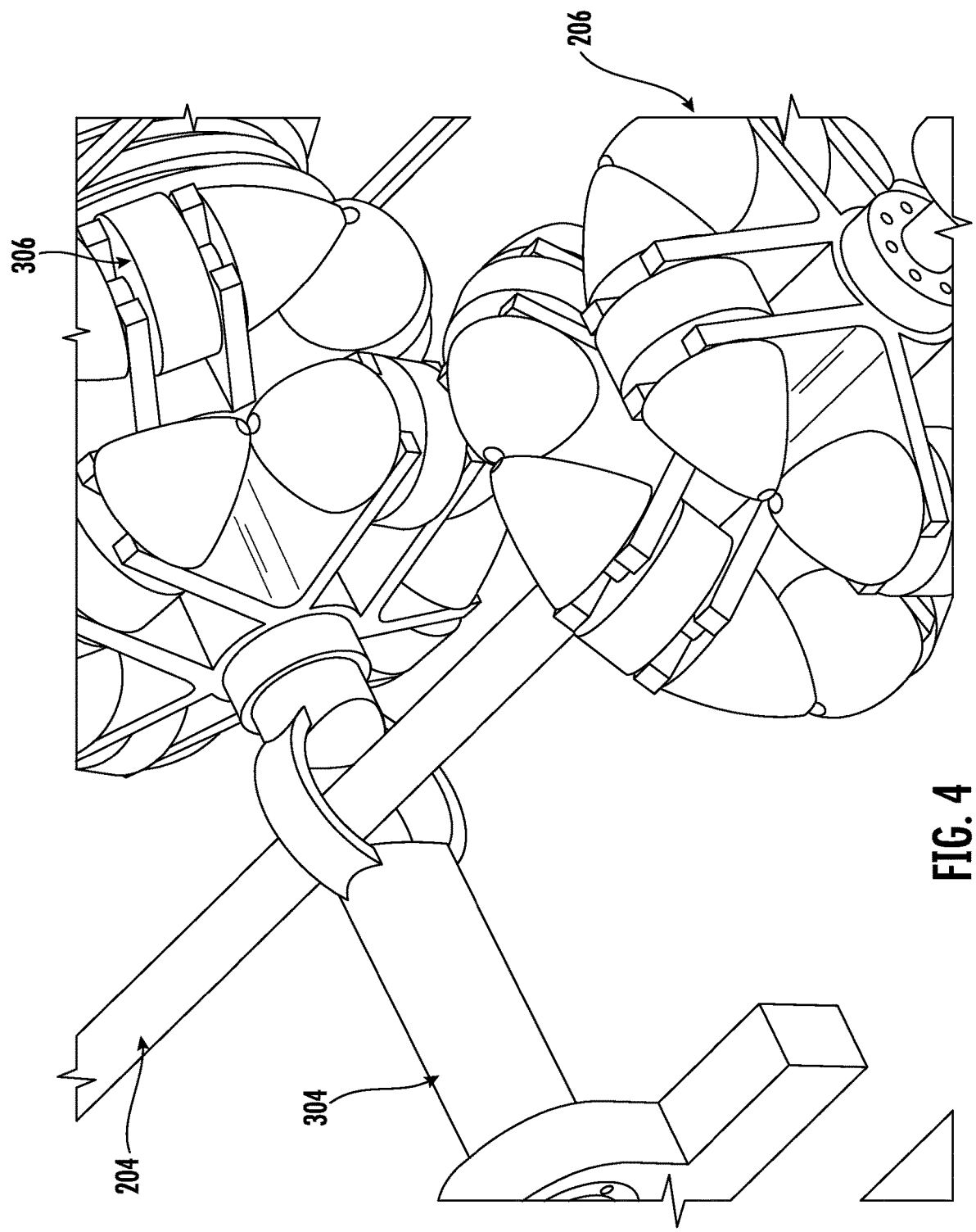
FIG. 4 is an example angled perspective of example intersection of example shafts in accordance with some embodiments of the present disclosure.

Referring now to FIG. 4, a detailed view of an intersection between the first and second shaft assemblies 202, 302 is shown. As previously mentioned, the first and second shaft assemblies 202, 302 may be disposed in the same plane of the apparatus 100. As shown in FIG. 4, one or more shafts of the second plurality of shaft assemblies 304 may include a hole through which one of more shafts of the first plurality of shaft assemblies 204 may be disposed. The hole may be large enough such that one or more shafts of the first plurality of shafts 204 may rotate freely and independently and not interfere with the second plurality of shafts 304 or for that matter any other components of the apparatus 100. Additionally, as shown in at least FIG. 4, ample clearance gaps are provided between the first and second plurality of wheels 206, 306, thereby allowing each wheel to rotate independently of the other without interference.

Example Multi-Shaft Transport Systems

Figure 5A:
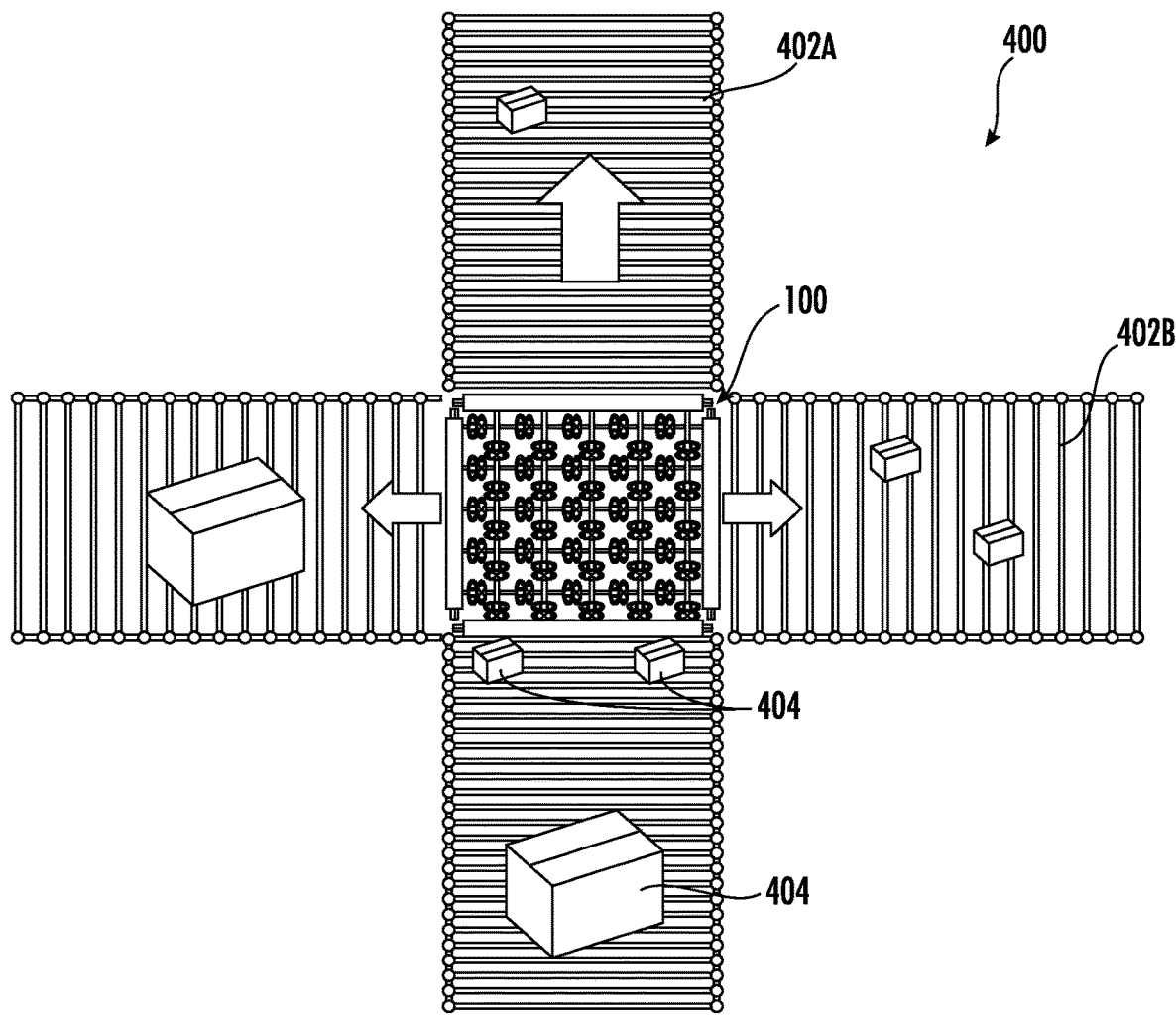
FIG. 5A is an example top view of an example multi-shaft transport system using an example multi-shaft transport system in accordance with some embodiments of the present disclosure.
Figure 5B:
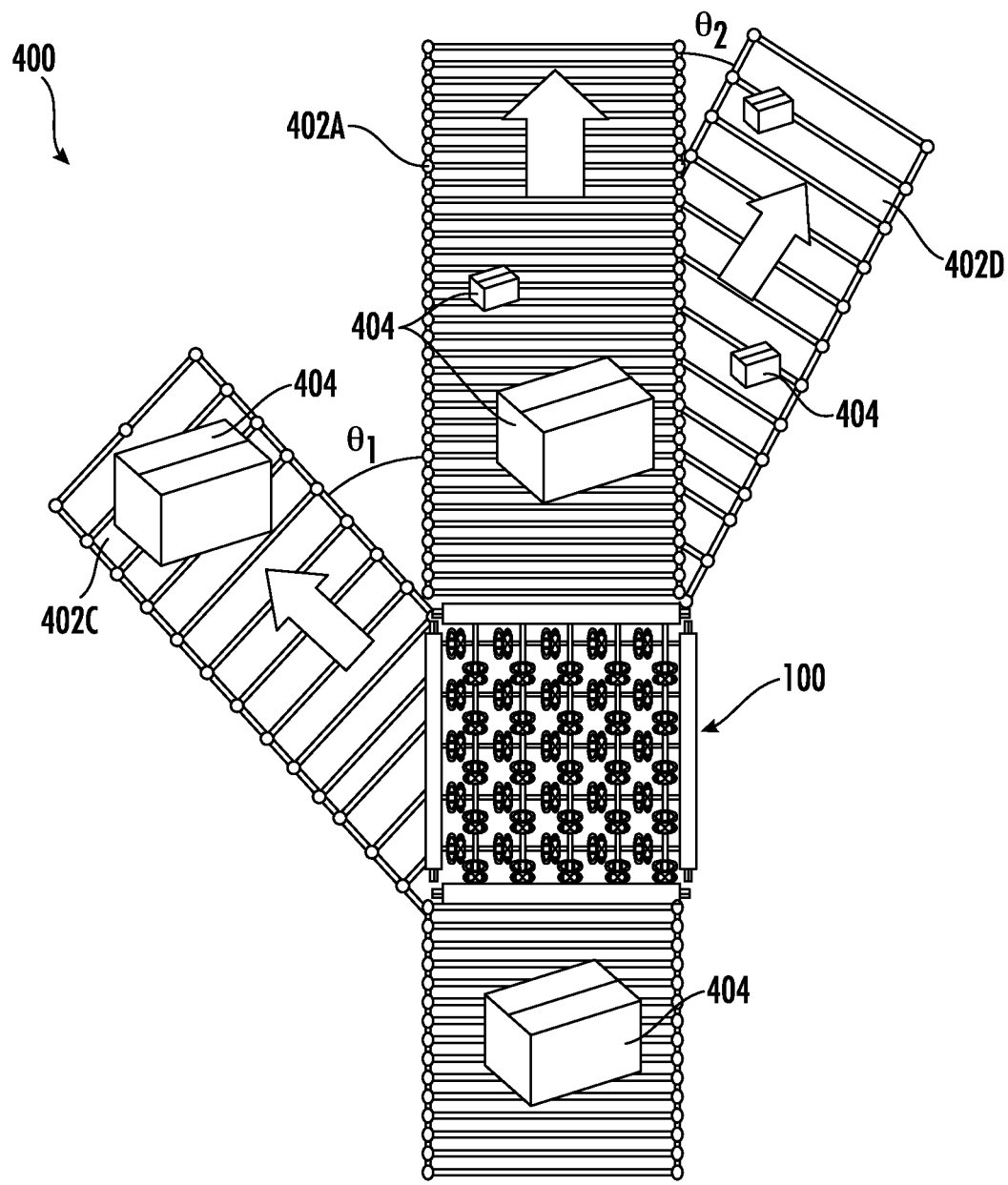
FIG. 5B is an example top view of an example multi-shaft transport system using an example multi-shaft transport system in accordance with some embodiments of the present disclosure.

Referring now to FIGS. 5A and 5B, an implementation of the multi-shaft transfer apparatus 100 into a conveyor system 400 is shown. In some embodiments, the conveyor system 400 may include one or more conveyor belts 402. In some embodiments, one or more objects 404 may be supported by the system 400. In some embodiments, the one or more objects 404 may be transported by the one or more conveyor belts 402 of the system 400.

As shown in FIGS. 5A and 5B, the system 400 may include a first conveyor belt 402A that travels in a first direction as indicated by the arrow. As shown in FIG. 5A, the system 400 may include a second conveyor belt 402B that travels in a second direction perpendicular to the first conveyor belt 402A. As indicated by the arrows in FIG. 5A, the second conveyor belt 402B may be configured to travel in more than one direction parallel to the first conveyor belt 402A, depending on the needs of the system 400.

As shown in FIG. 5B, the system 400 may include a third conveyor belt 402C that travels in a third direction at a second angle $\theta_1$ to the first conveyor belt 402A. In some embodiments, $\theta_1$ may be 45 degrees. As shown further in FIG. 5B, the system 400 may include a fourth conveyor belt 402D that travels in a fourth direction at a second angle to the first conveyor belt 402A. In some embodiments, $\theta_2$ may be a thirty degree angle. It will be understood that various configurations of conveyor belts 402 disposed at various angles to each other may be embodied with a system 400.

The system 400 may move the one or more objects 404 along the various flow paths by manipulating the power of the drivers 110, 112, which will thereby change the respective speeds at which the first and second shaft assemblies 202, 302 operate. For example, referring to FIG. 5A, the one or more objects 404 may be diverted to traveling along the second conveyor belt 402B when the second driver 112 is depowered and the first driver 110 is powered; in this configuration, the second plurality of wheel assemblies of the second shaft assembly will not rotate while the first plurality of shafts (and, by extension, the first plurality of wheel assemblies) of the first shaft assembly rotate. The one or more objects 404 will then be moved by first shaft assembly onto the second conveyor 402B. As another example, referring now to FIG. 5B, the first and second drivers 110, 112 may each be powered at approximately equal levels (causing the first and second shaft assemblies 202, 302 to rotate at approximately equal forces), which will cause the one or more objects 404 to be diverted along to the third conveyor belt 402C. In still another example, the first driver 110 may be powered at approximately 66% of the level of the second driver 112, causing the one or more objects 404 to be diverted onto the fourth conveyor belt 402D.

According to various embodiments, and as shown in at least FIGS. 5A and 5B, the system 400 may include a multi-shaft transfer apparatus 100 as previously described. In some embodiments, the apparatus 100 may be positioned at a junction point between two or more conveyor belts (e.g., between first 402A and second 402B or between first 402A and third and fourth 402C, 402D).

In some embodiments, the apparatus 100 may be enclosed in the housing 102 (as in FIG. 1D) before it is incorporated into the system 400, with only the wheel assemblies 206, 306 being exposed. The apparatus 100 is shown without the housing 102 in at least FIGS. 5A and 5B to highlight various features of the first and second shaft assemblies 202, 302, but it will be understood that the system 400 will function similarly with the housing 102 enclosed around the apparatus 100.

In some embodiments, the system 400 may include a controller that may remotely control one or more drivers 110, 112 of the system 400. As previously described, the first and second shaft assemblies 202, 302 may be selectively controlled to move one or more objects traveling along the system 400. According to various embodiments, the first shaft assembly 202 and the second shaft assembly 302 may be controlled manually and remotely by a technician operating the system 400. In other embodiments, the shaft assemblies 202, 302 may be controlled automatically, and the apparatus 100 may be configured to engage rollers 110, 112 at predetermined times to move one or more objects 404 throughout the system 400.

Example Methods of Using a Multi-Shaft Transport System

Figure 6:
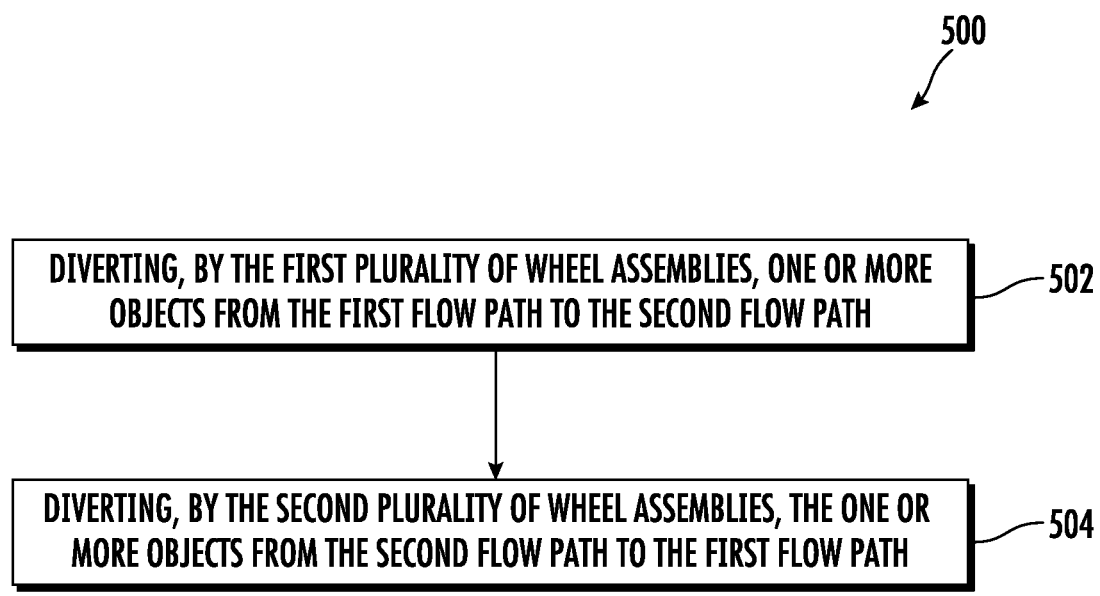
FIG. 6 is an example flow chart illustrating an example method of using an example multi-shaft transport system in accordance with some embodiments of the present disclosure.

FIG. 6 is an example flow chart of an example method 500 of use for a multi-shaft transport system. Although the method 500 is described with reference to the apparatus 100 and system 400 and their various components previously described the method 500 may be implemented on any number of suitable apparatuses and systems.

In some embodiments, the method 500 may include a first step 502 of diverting, by the first plurality of wheel assemblies, one or more objects from the first flow path to the second flow path. In some embodiments, the method 500 may include a second step 504 of diverting, by the second plurality of wheel assemblies, the one or more objects from the second flow path to the first flow path.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A multi-shaft transport apparatus comprising:
    a first shaft assembly comprising:
        a first plurality of shafts aligned in a first direction, wherein one or more shafts of the first plurality of shafts are rotatable shafts; and
        a first plurality of wheel assemblies operably connected to the first plurality of shafts and configured to rotate with the one or more shafts of the first plurality of shafts;
    a set of pulleys comprising one or more pulleys operably connected to the one or more shafts of the first plurality of shafts;
    a first driver operably connected to the set of pulleys and configured to drive the one or more pulleys such that the one or more pulleys cause the one or more shafts of the first plurality of shafts to rotate; and
    a second shaft assembly comprising:
        a second plurality of shafts aligned in a second direction, wherein one or more shafts of the second plurality of shafts are fixed shafts;
        a second plurality of wheel assemblies operably connected to the second plurality of shafts; and
        a second driver operably connected to and configured to drive one or more of the second plurality of wheel assemblies.

2. The multi-shaft transport apparatus of claim 1, further comprising one or more belts configured to operably connect the second driver with one or more wheel assemblies of the second plurality of wheel assemblies.

3. The multi-shaft transport apparatus of claim 1, wherein the first driver and the second driver comprise motor-driven rollers.

4. The multi-shaft transport apparatus of claim 1, wherein the first plurality of shafts has a first diameter and the second plurality of shafts has a second diameter.

5. The multi-shaft transport apparatus of claim 4, wherein the first and second diameters comprise different lengths.

6. The multi-shaft transport apparatus of claim 1, wherein the first shaft assembly and the second shaft assembly are aligned along a shared plane.

7. The multi-shaft transport apparatus of claim 1, wherein one or more of the first plurality of wheel assemblies and the second plurality of wheel assemblies comprise omnidirectional wheels.

8. The multi-shaft transport apparatus of claim 1, wherein the first direction and the second direction are orthogonal.

9. The multi-shaft transport apparatus of claim 1, further comprising a housing configured to at least partially enclose one or more of the first shaft assembly and the second shaft assembly.

10. The multi-shaft transport apparatus of claim 1, further comprising one or more motion transfer devices configured to do one or more of transfer motion from the first shaft assembly to the second shaft assembly or to transfer motion from the second shaft assembly to the first shaft assembly.

11. The multi-shaft transport apparatus of claim 1, wherein one or more of the first plurality of shafts and the second plurality of shafts further comprises an over-molded plastic shaft.

12. A multi-shaft transport system comprising:
a first conveyor system configured to transport one or more objects in a first flow path aligned along the first conveyor system;
a second conveyor system configured to transport the one or more objects in a second flow path aligned along the second conveyor system; and
a multi-shaft transport apparatus disposed at least partially within the first conveyor system, the multi-shaft transport apparatus comprising:
  a first shaft assembly comprising:
    a first plurality of shafts aligned in a first direction, wherein one or more shafts of the first plurality of shafts are rotatable shafts;
    a first plurality of wheel assemblies operably connected to the first plurality of shafts and configured to rotate with the one or more shafts of the first plurality of shafts that are rotatable shafts;
  a second shaft assembly comprising:
    a second plurality of shafts aligned in a second direction, wherein one or more shafts of the second plurality of shafts are fixed shafts;
    a second plurality of wheel assemblies operably connected to the second plurality of shafts;
  a set of pulleys comprising one or more pulleys operably connected to the one or more shafts of the first plurality of shafts that are rotatable shafts;
  a first driver operably connected to the set of pulleys and configured to drive the one or more pulleys such that the one or more pulleys cause the one or more shafts of the first plurality of shafts that are rotatable shafts to rotate; and
  a second driver, and wherein the second driver is operably connected to and configured to drive one or more wheels of the second plurality of wheel assemblies such that the one or more shafts of the second plurality of shafts that are fixed shafts remain fixed,
wherein the multi-shaft transport apparatus is configured to do one or more of:
  divert a first flow of the one or more objects from the first flow path of the first conveyor system to the second flow path of the second conveyor system, or
  divert a second flow of the one or more objects from the second flow path of the second conveyor system to the first flow path of the first conveyor system.

13. The multi-shaft transport system of claim 12, further comprising one or more belts configured to operably connect the second driver with the one or more wheels of the second plurality of wheel assemblies.

14. The multi-shaft transport system of claim 12, wherein the first driver and the second driver comprise motor-driven rollers.

15. The multi-shaft transport system of claim 12, wherein one or more of the first plurality of wheel assemblies and the second plurality of wheel assemblies comprise omnidirectional wheels.

16. The multi-shaft transport system of claim 12, wherein the first flow path and the second flow path define an angle between them, the angle ranging between 0 degrees and 90 degrees.

17. The multi-shaft transport system of claim 12, further comprising one or more motion transfer devices configured to do one or more of transfer motion from the first shaft assembly to the second shaft assembly or to transfer motion from the second shaft assembly to the first shaft assembly.

18. The multi-shaft transport system of claim 12, wherein one or more of the first plurality of shafts and the second plurality of shafts further comprises an over-molded plastic shaft.

* * * * *